# 3,361,742
5-OXO-1H-PYRROLO-[2,1-c][1,4]-BENZODIAZEPIN-2-ACRYLAMIDES

Julius Berger, Passaic, Andrew E. Karr, Bloomfield, Willy Leimgruber, Cedar Grove, Arno Johannes Schocher, Boonton, Vladimir Stefanovic, Passaic, and Benjamin Tabenkin, Upper Montclair, N.J., assignors to Hoffmann-La Roche Inc., Nutley, N.J., a corporation of New Jersey
No Drawing. Filed Dec. 7, 1964, Ser. No. 416,599
9 Claims. (Cl. 260—239.3)

This invention relates to antibiotics and to processes for their preparation.

It is known that the cultivation of certain thermophilic actinomycetes results in the production of a fermentation broth having anticancer activity (see, e.g., South African application No. 63/3,875). There have now been discovered fermentation, isolation, and conversion procedures which result in compounds having high antibacterial and anticancer activity. The thermophilic actinomycetes which can be employed in the process of the invention are two strains of the genus Streptomyces and the species *refuineus* var. *thermotolerans* having NRRL numbers 3143 and 3144.

The above strains have the following taxonomic description:

Substrate mycelium branched, 0.5 to 0.7μ in diameter. Growth at first white, progressing to medium yellow, yellow-orange, or medium tan; or white, changing to gray, gray-green (near grey ½ fe) (Descriptive Color Names Dictionary, Container Corporation of America), olive or black. Aerial mycelium moderate to abundant, powdery or sometimes cottony, white, cream-yellow, or medium gray to deep gray-green (near gray 24½ ml.), depending on the medium composition. Sporophores monopodially branched, with numerous open extended or compact spirals, the latter occurring infrequently; spirals usually with 1 to 4 coils, sometimes up to 8 to 10 turns. Spores oval, short to elongated, irregularly rough to warty, 0.5 to 1.2 by 1.0 to 2.3μ. Mycelium and spores gram-positive, not acid-fast. Vegetative mycelium lysozyme sensitive. Soluble pigment produced in several media. Facultative thermophile. Habitat: donkey dung.

In the specification, the color designations in parentheses are according to Descriptive Color Names Dictionary, Container Corporation of America.

Growth characteristics

*Procedure.*—The inoculum for culture studies was developed in shaken flasks for 14–16 hours at 45° C., in the medium 0.5% Bacto-Tryptone plus 0.3% Bacto yeast extract to volume with distilled water.

The instant strains were grown at 45° C. for about 2 days, unless otherwise stated, before their culture characteristics were determined. Cultures were then reincubated for an additional period of 3 to 10 days to observe if any further changes occurred.

The following media designations are taken from Applied Microbiology 9: 394–399 (1961).

Maintenance medium Ia

NRRL 3143, growth thin, white to gray. Aerial mycelium moderate, white to light gray.
NRRL 3144, growth good, white to deep gray. Aerial mycelium abundant, white to cream-yellow to light gray.

Medium Ib

NRRL 3143, growth abundant, white to light gray, later deep gray-black. Aerial mycelium moderate, thin, white to medium gray-green.
NRRL 3144, growth abundant, white to medium gray, changing to deep gray. Aerial mycelium abundant, cottony, white, later gray-green.

Medium II

NRRL 3143, growth good, pale gray changing to deep gray. Aerial mycelium abundant, light gray to medium gray.
NRRL 3144, growth good, medium to deep gray. Aerial mycelium light gray, changing to medium gray, then greenish-gray.

Medium III

NRRL 3143, growth moderate, restricted, white to pale gray. Aerial mycelium scant, appearing late, white to light gray.
NRRL 3144, growth good, white to pale cream-yellow. Aerial mycelium scant, white to cream-yellow, later light gray.

Medium IV

NRRL 3143, growth thin, white to light gray. Aerial mycelium light gray to medium gray.
NRRL 3144, growth thin, white to cream-yellow, later light gray. Aerial mycelium cream-yellow to light gray.

Medium V

NRRL 3143, growth good, white then gray to light brown. Aerial mycelium thin, white at first, later pale gray-green. Soluble pigment light brown.
NRRL 3144, growth good, white, later cream-yellow to light brown. Aerial mycelium thin, white to cream-yellow, changing to light gray-green. Soluble pigment light brown.

Medium VI

NRRL 3143, growth good, relatively thick, light gray, later changing to dark gray-green. Aerial mycelium abundant, cottony, light gray, becoming light gray-green. Soluble pigment yellow, later tan, light yellow reverse.
NRRL 3144, growth abundant, thick, medium gray to gray-green (near gray 24½ fe). Aerial mycelium medium gray, later becoming gray-green (near gray 24½ ml.). Soluble pigment yellow, later tan, light yellow reverse.

Medium VII

NRRL 3143, growth very thin, creeping, light gray. Aerial mycelium scant, white to light gray.
NRRL 3144, growth thin, creeping, light gray. Aerial mycelium scant, light gray.

Tomato oatmeal

No growth with either culture at 28° C. or at 45° C.

Amidex

NRRL 3144, 45° C., growth abundant, white to lemon-yellow, later dark olive. Aerial mycelium white to cream, becoming light gray. Soluble pigment light tan.
NRRL 3144, 28° C., growth abundant, white to pale yellow, changing to mustard tan. Aerial mycelium moderate, light gray. No soluble pigment.
NRRL 3143, 45° C., growth abundant, white to light gray, changing to dark olive. Aerial mycelium white to light gray. Soluble pigment light tan.
NRRL 3143, 28° C., growth moderate, white, later camel (3 ie). Aerial mycelium scant, white. No soluble pigment.

Czapek—glucose

NRRL 3144, 45° C., growth scant, white to pale yellow. Aerial mycelium sparse, white. No soluble pigment.
NRRL 3144, 28° C., growth fair, white to ivory, then medium olive. Aerial mycelium scant, white. No soluble pigment.
NRRL 3143, 45° C., growth very poor, white. Aerial mycelium scant, white. No soluble pigment.
NRRL 3143, 28° C., growth fair, white to pale yellow. Aerial mycelium scant, white. No soluble pigment.

Yeast and malt extract

NRRL 3144, 45° C., excellent growth, white to pale yellow. Aerial mycelium white to cream. Soluble pigment pale yellow.

NRRL 3144, 28° C., abundant growth, white to pale yellow or medium olive. Aerial mycelium white to medium gray. No soluble pigment.

NRRL 3143, 45° C., growth abundant, white to pale orange-yellow. Aerial mycelium white, mealy. Soluble pigment light yellow.

NRRL 3143, 28° C., growth abundant, white to light yellow. Aerial mycelium moderate, white. No soluble pigment.

Glucose—nutrient

NRRL 3144, 45° C., growth scant, white to cream-yellow. Aerial mycelium trace, white. Soluble pigment not observed.

NRRL 3144, 28° C., growth moderate, white to pale yellow. Aerial mycelium scant, white. No soluble pigment.

NRRL 3143, 45$ C., growth scant, white to pale yellow. Aerial mycelium trace, white. No soluble pigment.

NRRL 3143, 28° C., growth good, white to pale yellow-brown. Aerial mycelium scant, white. No soluble pigment.

Glucose—nutrient+glycerol

NRRL 3144, 45° C., excellent growth, white to pale orange-yellow. Aerial mycelium sparse, white. Soluble pigment pale orange-yellow.

NRRL 3144, 45° C., excellent growth, white to pale orange-yellow. Aerial mycelium sparse, white. Soluble pigment pale orange-yellow.

NRRL 3144, 28° C., growth moderate, white, later golden yellow. Aerial mycelium scant, white. No soluble pigment.

NRRL 3143, 45° C., growth abundant, white to pale yellow-orange. Aerial mycelium scant, white. Soluble pigment pale orange-yellow.

NRRL 3143, 28° C., growth moderate, white to golden yellow, then tan. Aerial mycelium scant, white. No soluble pigment.

P and G dextrin

NRRL 3144, 45° C., growth scant, white to pale yellow. Aerial mycelium powdery, white. No soluble pigment.

NRRL 3144, 28° C., growth scant, white to pale yellow, later medium olive. Aerial mycelium moderate, white. Trace of pale yellow soluble pigment.

NRRL 3143, 45° C., growth moderate, white to cream. Aerial mycelium white, powdery. No soluble pigment.

NRRL 3143, 28° C., growth scant, white to light yellow. Aerial mycelium poor, white. Trace of pale yellow soluble pigment.

Glucose asparagine

NRRL 3144, 45° C., growth very sparse, white. Aerial mycelium scant, white. No soluble pigment.

NRRL 3144, 28° C., growth fair, white to pale cream-yellow. Aerial mycelium moderate, powdery, white. No soluble pigment.

NRRL 3143, 45° C., growth scant, white to cream. Aerial mycelium trace, white. No soluble pigment.

NRRL 3143, 28° C., growth poor, white to cream-yellow. Aerial mycelium scant, white. No soluble pigment.

Starch

NRRL 3144, 45° C., growth excellent, white to cream-yellow, later light olive. Aerial mycelium white to cream, then light gray. Hydrolysis good. Trace of yellow, soluble pigment.

NRRL 3144, 28° C., growth excellent, white to cream-yellow, later light olive. Aerial mycelium abundant, white, later medium gray. Hydrolysis good. Trace of light yellow, soluble pigment.

NRRL 3143, 45° C., growth moderate, white to pale yellow. Aerial mycelium white, powdery. Hydrolysis good. Trace of yellow, soluble pigment.

NRRL 3143, 28° C., growth moderate, white to cream-yellow to tan. Aerial mycelium abundant, white. Hydrolysis good. Trace of pale yellow, soluble pigment.

Skim milk

NRRL 3144, 45° C., growth scant, white to pale yellow. Aerial mycelium scant, white. Hydrolysis good. Light brown soluble pigment.

NRRL 3144, 28° C., growth moderate, white to pale yellow. Aerial mycelium, thin, white. Hydrolysis good. Light tan, soluble pigment.

NRRL 3143, 45° C., growth scant, white to pale yellow. Aerial mycelium sparse, white. Hydrolysis good. Pale brown, soluble pigment.

NRRL 3143, 28° C., growth fair, white to light yellow. Aerial mycelium sparse, white. Hydrolysis good. Trace pale brown, soluble pigment.

Bennett's agar

NRRL 3144, 45° C., growth excellent, white to pale yellow-orange, later medium tan. Aerial mycelium sandy to light gray. Trace of yellow, soluble pigment.

NRRL 3144, 28° C., growth excellent, white to pale yellow. Aerial mycelium white. No soluble pigment.

NRRL 3143, 45° C., growth moderate, white to pale yellow, later medium tan. Aerial mycelium scant, white. Trace of soluble pale yellow pigment.

NRRL 3143, 28° C., growth excellent, white at first, later cream-yellow. Aerial mycelium abundant, white. No soluble pigment.

Carrot plug and potato plug

No growth was observed with either strain at 28° C. or 45° C.

Metabolic activities

Hydrogen sulfide test (Bacto peptone iron agar). No H₂S was produced by either strain at 28° C. or at 45° C.

Growth of NRRL 3144 and NRRL 3143 was relatively poor on the peptone-iron agar. NRRL 3144 produced yellow to olive growth; aerial mycelium scant, white to gray. NRRL 3143 produced pale yellow growth but no aerial mycelium.

TYROSINE TEST

| Culture | Test Temperature, °C. | Day of Reading | Growth | Aerial Mycelium | Color of Reverse | Color Pigment |
|---|---|---|---|---|---|---|
| NRRL 3144 | 28 | 4 | None | | Ivory | Pale salmon. |
| | 28 | 7 | Scant | None | Pale yellow | Light beige. |
| | 28 | 14 | Fair | Scant | Light yellow | Pale salmon. |
| | 45 | 2 | Poor | White | Yellow | Light vinaceous. |
| | 45 | 4 | Fair | Gray | Light olive yellow | Light tea brown. |
| | 45 | 6 | ----do---- | ----do---- | | |
| NRRL 3143 | 28 | 4 | None | | Ivory | Pale salmon. |
| | 28 | 7 | Fair | White | Pale yellow | Light beige. |
| | 28 | 14 | ----do---- | ----do---- | Light cream | Pale flesh. |
| | 45 | 2 | Poor | None | ----do---- | Pale salmon. |
| | 45 | 4 | ----do---- | White | ----do---- | Fawn. |
| | 45 | 6 | ----do---- | ----do---- | | |

ACTION ON MILK

| Culture | Temperature, °C. | Day of Reading | Coagulation | Peptonization | Growth | Pigment |
|---|---|---|---|---|---|---|
| NRRL 3144 | 28 | 2 | 0 | 0 | 0 | 0. |
|  | 28 | 7 | 0 | 0 | Slight, light yellow | 0. |
|  | 28 | 14 | 0 | 0 | do | 0. |
|  | 28 | 21 |  |  |  |  |
|  | 45 | 1 | 0 | 0 | 0 | 0. |
|  | 45 | 2 | 0 | 0 | 0 | 0. |
|  | 45 | 4 | + | + | Not visible | Light beige. |
|  | 45 | 5 | + | + (20%) | Visible on ring | Do. |
| NRRL 3143 | 28 | 2 | 0 | 0 | 0 | 0. |
|  | 28 | 7 | 0 | 0 | Trace, light yellow | 0. |
|  | 28 | 21 |  |  |  |  |
|  | 45 | 1 | 0 | 0 | 0 | 0. |
|  | 45 | 2 | 0 | 0 | 0 | 0. |
|  | 45 | 4 | + (incomplete) | 0 | Few ring colonies, light yellow. | Light beige. |
|  | 45 | 5 | + | + (25%) | do | Do. |

*Proteolytic activity*

No liquefaction of gelatin was observed at 28° C. or at 45° C. with either culture. All inoculated gelatin tubes were incubated for 10 days at 45° C. or 14 days at 28° C. But high proteolytic activity vs. many proteins was observed on complex media.

*Nitrate reductase activity*

*Organic broth.*—NRRL 3144, 45° C., surface and submerged growth recorded in 48 hours; no nitrate reduction observed after 6 days.

NRRL 3144, 28° C., surface and submerged growth observed in 7 days; no nitrate reduction after 14 days.

NRRL 3143, 45° C., surface and submerged growth developed in 48 hours; no nitrate reduction observed in 6 days.

NRRL 3143, 28° C., submerged growth observed in 7 days; no nitrate reduction after 14 days.

*Inorganic broth.*—NRRL 3144, 45° C., light submerged growth observed in 4 days; no nitrate reduction after 6 days.

NRRL 3144, 28° C., surface and submerged growth recorded in 7 days; no nitrate reduction after 14 days.

NRRL 3143, 45° C., no visible growth detected during 6 day period.

NRRL 3143, 28° C., some submerged growth recorded in 7 days; no nitrate reduction after 14 days.

NITROGEN UTILIZATION TEST

| Test Compound | Growth Observations | | | |
|---|---|---|---|---|
|  | NRRL 3144 | | NRRL 3143 | |
|  | 28° C. | 45° C. | 28° C. | 45° C. |
| NaNO₃ | +(++) | +(++) | +(++) | + |
| (NH₄)₂SO₄ | − | + | + | + |
| NH₄-acetate | − | − | − | − |
| Asparagine | ++ | ++ | ++ | +(++) |
| Arginine | − | − | − | − |
| Betaine HCl | − | − | − | − |
| α-Aminoisobutyric acid | ± | + | ± | + |
| Creatine | ± | ++ | (+) | ++ |
| Sodium glutamate | +(++) | ++ | +(++) | +(++) |
| Glycine | (+) | + | + | (+) |
| Leucine | +(++) | (+) | +(++) | (+) |
| Methionine | + | + | + | ++ |
| Sarcosine | ++ | + | + | + |
| Tryptophane | − | − | − | − |
| Tyrosine | + | + | + | + |
| Casamino acids | + | + | + | + |
| Gelatin | + | + | + | + |
| Egg albumin | − | − | − | − |

Explanation of signs:
− growth like control, i.e., with glucose but without nitrogen source.
± poor growth.
(+) poor to fair growth.
+ fair growth.
++ good growth.
Incubation time: 45° C.—65 hours; 28° C.—100 hours.

CARBON UTILIZATION TEST

| Test Compound | Growth Observations | | | |
|---|---|---|---|---|
|  | NRRL 3144 | | NRRL 3143 | |
|  | 28° C. | 45° C. | 28° C. | 45° C. |
| Xylose | (+) | ++ | (+) | ++ |
| Arabinose | + | +(++) | +(++) | ++ |
| Rhamnose | + | ++ | + | ++ |
| Dextrose | + | + | +(++) | + |
| Fructose | +(++) | + | + | + |
| Saccharose | − | − | − | − |
| Lactose | − | − | − | − |
| Raffinose | − | − | − | − |
| Inositol | − | − | − | − |
| Inulin | − | − | − | − |
| Maltose | +(++) | ++ | +(++) | ++ |
| Mannitol | − | − | − | − |
| Salicin | − | − | − | − |
| Sorbitol | − | − | − | − |
| Galactose | (+) | ++ | ± | ++ |
| Mannose | + | +(++) | (+) | + |
| Dulcitol | − | − | − | − |
| Cellobiose | +(++) | +(++) | +(++) | +(++) |
| Dextrin | +(++) | ++ | +(++) | ++ |
| Starch | − | − | − | − |
| Glycerol | ± | +(++) | ± | ± |
| Phenol | − | − | − | − |
| Na-acetate | (+) | + | ± | ± |
| Na-citrate | ± | + | ± | ± |
| Na-succinate | − | ± | − | ± |

Explanation of signs:
− growth like control, i.e., with (NH₄)₂SO₄ but without carbon source.
± poor growth.
(+) poor to fair growth.
+ fair growth.
++ good growth.
Incubation time: 45° C.—65 hours; 28° C.—100 hours.

The fermentation process of the invention is carried out by culturing one of the above organisms in a nutrient medium. The characteristics of the nutrient media are highly important for obtaining good yields of the antibiotic of the invention. In particular, the nutrient media must have the following characteristics in order to give good antibiotic yields:

(1) From about 0.1 to about 9.0, preferably from about 1.0 to about 5.0 percent by weight of complex protein-containing products, in the final nutrient medium. The protein source should have a ratio of total nitrogen to amino nitrogen greater than 3 and the total nitrogen in the medium should be in the range of from about 0.005 to about 0.48, preferably from about 0.015 to about 0.20 percent w./v. Examples of protein sources that answer the above requirements include milk products, e.g., peptonized milk or dried milk, skim milk, etc.; enzymatic digests of soy, yeast, fish or peanut proteins, or mixtures thereof.

(2) A carbohydrate source. The quantity of carbohydrate does not appear to be too significant and is generally in the range of from about 0.25 to about 11.5 percent w./v. Carbohydrate sources that can be employed include alcohols, sugars and crude or purified starches, e.g., corn starch, potato starch, soluble starches, glycerol, mannitol, lactose, maltose, etc.

(3) The initial pH of the fermentation broth must be in the range of from about 6 to about 8.5, preferably from about 6.7 to about 7.3. After about 12 to about 15 hours of fermentation, the pH is maintained thereafter in the range of about 6.0 to about 6.9, e.g., by the addition of an alkali metal hydroxide, e.g., sodium hydroxide, or by sulfuric acid.

Also, there can be added up to about 2.5 percent of dried yeast or yeast extract to the basal medium. However, this is an optional ingredient.

The fermentation is carried out by forming a nutrient medium as described above, sterilizing it, e.g., at 120° C. for 15 to 20 minutes, and then inoculating the nutrient medium either with spores or vegetative growth of one of the above organisms and permitting the fermentation to proceed with agitation and aeration at a temperature in the range of from about 35° to about 55°, preferably from about 40° to about 50° C. and from about 5 to about 100, preferably about 12 to about 30 hours.

The fermentation broth is then optionally filtered, and extracted with an extraction solvent, preferably in two extraction steps.

Extraction solvents that can be employed in both extraction steps include (a) a solvent comprising a monohydric saturated aliphatic alcohol having a boiling point up to about 200° C. which has a low miscibility (e.g., less than 25 percent) with cold water, e.g., n-butanol, isobutanol, n-pentanol, n-hexanol, 4-methyl-2-pentanol, etc. This solvent can be entirely one of said alcohols or a mixture of said alcohols or can be a homogeneous mixture of one or more of said alcohols with up to about 90 percent by volume of another solvent having a low miscibility with cold water such as a mono- or polyhalogenated hydrocarbon having a boiling point between about 40° and about 200° C., e.g., chloroform, carbon tetrachloride, methylene chloride, ethylene dichloride, etc. The halogen substituents can be chloro, bromo, iodo, or fluoro. Other solvents that can be employed in mixtures with alcohols include ethers, esters, ketones, aromatic hydrocarbons, etc., which have a low miscibility with cold water.

In the first extraction step, the solvent to fermentation broth ratio employed is in the range of from about 4:1 to about 1:10, depending on the equipment used, the solvent employed, and the degree of extraction desired. The ratio for batch extraction is usually about 1:1 to about 4:1. The ratio for column counter-current extraction is usually about 1:2 to about 1.3:1. A pH in the range of from about 4 to about 10, preferably about 6, is preferred for carrying out the first extraction. The solvent containing extracted solids from the fermentation broth is then concentrated to from about 1 to about 15 percent, preferably about 5 to 7 percent by weight solids content. The concentration step can be carried out by any technique known to those skilled in the art such as evaporation under reduced pressure.

In the second extraction step, the concentrate is introduced into about the center of a multi-stage fractional liquid extraction column. Simultaneously, water which can optionally be previously equilibrated with the solvent phase is introduced near the top of the column, and a solvent phase optionally in equilibrium with water is introduced near the bottom of the column. The solvent to water ratio is in the range of from about 1:5 to about 1:15, preferably about 1:10. The feed solution to water ratio is in the range of about 1:30. Most of the product is extracted into the solvent phase which leaves the top of the column.

n-Butanol is the preferred solvent for use in both of the above extraction steps. When n-butanol is employed, about ½ to about 1 percent of the total solids dissolved in the fermentation broth pass into the n-butanol phase. This percentage of the solids contains most of the product.

The above steps of extracting the broth with a solvent, concentrating the solvent extract, and carrying out a fractional liquid extraction of the concentrate can also be carried out by omitting the concentrating step, although this process is much less efficient. Also, the second extraction step above can be omitted, but the yield of product may be decreased somewhat.

The above solvent extract obtained from the fractional liquid extraction column is concentrated by evaporation to a solution or paste containing about 5 to about 20 percent solids; then about 25 to about 50 volumes of n-hexane are added, and the resulting slurry filtered. The precipitated product is then vacuum-dried to give a solid compound in the form of a partially purified yellow powder of about 45 to about 75 percent purity. This compound is useful in the same manner as the compounds of Formulas I, II, III, and IV disclosed hereinafter, with dosages adjusted to animal response.

The compound of from about 45 to about 75 percent purity, obtained above, is further purified by one of the following techniques:

(a) The 45–75 percent pure compound is partitioned between a solvent system comprising either a chloroform-lower alkanol-water system or an ethyl acetate-water system. Examples of solvent systems useful in the practice of the invention include chloroform:isopropanol:water (1:1:2 v./v. mixture), ethylacetate:water (19.5:9), chloroform:isopropanol:ethanol:water (3:1:1:5 v./v.), chloroform:isopropanol:methanol:water (3:1:1:5 v./v), etc. The partitioning is carried out in e.g., a Craig counter-current distribution apparatus, e.g., having 200 tubes, or in an extraction column. When the distribution is carried out in the Craig apparatus, the compound is dissolved in one of the above solvent systems, and placed in one or more of the first tubes of the Craig apparatus. The solutions in those tubes showing a U.V. maximum at 330–335 m$\mu$ and significant in vitro activity against Bacillus sp. TA (NRRL [1] B–3167) are combined, and the phases separated. In place of Bacillus sp. TA, various other organisms can equally well be employed, for example, *Staphylococcus aureus, Sarcina lutea, Bacillus subtilis, Escherichia coli* bacteriophage T–5, etc. The organic solvent phase is evaporated to dryness at a temperature below about 35° C. and the aqueous phase evaporated to a small volume, also at a temperature below about 35° C. The residues from both phases are combined and lyophilized, affording a compound which is about 80–90 percent pure.

This material is obtained in purified amorphous form by dissolving the above 90 percent pure compound in a nonalcoholic organic solvent, e.g., acetonitrile, dimethylformamide, dimethylsulfoxide, $C_3$–$C_7$ ketones, such as acetone, etc., and then fractionally precipitating the product by the addition of an aliphatic hydrocarbon, e.g., petroleum ether, hexane, etc.

The 80–90 percent pure compound and the purified amorphous compound are also useful in the same manner as the compounds of Formulas I, II, III, and IV disclosed hereinafter.

(b) The 45–75 percent pure compound is dissolved in methanol in amount to form from about 2 to about 20 percent solution. The solution is filtered, then about 0.05 to about 0.5, preferably about 0.4, volumes of water per volume of methanol are added. The solution is then cooled to a temperature ranging from about −8° C. to about −20° C. The resulting slurry is filtered, optionally dried, and then dissolved in methanol to form from about 1 to about 20 percent, e.g., about 2 percent, solution. The solution is filtered and then from about 0.01 to about 0.3, preferably about 0.15, volumes of water per volume of methanol are added slowly with cooling, e.g., at a tem- ---
[1] Northern Utilization Research and Development Division, U.S. Department of Agriculture, Peoria, Ill.

perature in a range of from about −8° C. to about −20° C. The crystals which form are filtered, optionally dried, and again dissolved in methanol to form from about 1 to about 20, preferably about 2, percent solution. The solution is treated with activated charcoal, filtered, and then from about 0.01 to about 0.3, preferably about 0.15 volumes of water per volume of methanol are added slowly. The crystalline product obtained consists of a substantially pure compound. Further crystallization from methanol/water as above gives a pure compound of the formula

I

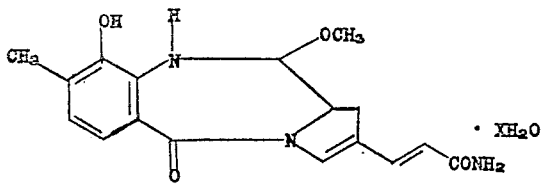

5,10,11,11a - tetrahydro-9-hydroxy-11-methoxy-8-methyl-5 - oxo - 1H-pyrrolo-[2.1-c] [1,4]-benzodiazepin-2-acrylamide. X is a number from 0 to 1.5. The above step can also be carried out successfully with an even less pure product, e.g., with a product of only about 20% purity.

The compound of Formula I or the purified amorphous material obtained by process (a) above can be heated in a nonalcoholic inert solvent, e.g., dimethylsulfoxide, acetonitrile, acetone, etc., boiling from about 50° C. at a temperature in the range of from about 50 to about 200° to form a compound of the formula

II

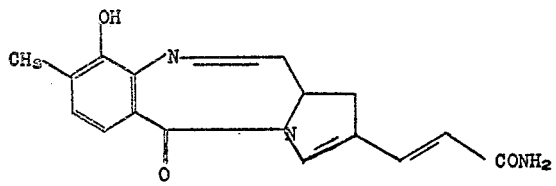

The compound of Formula II can then be reacted with either (a) water at a temperature in the range of from about 0° to about 100° C. or (b) with an alcohol having at least one —OH group, e.g., an alcohol of the formula

ROH wherein R is lower alkyl, phenyl lower alkyl, or amino lower alkyl, e.g., methyl, ethyl, butyl, benzyl, β-aminoethyl, etc.; or a di- or polyhydric alcohol, e.g., a sugar, mannitol, ethylene glycol, etc.

When water is employed, the product is a crystalline compound of the formula

III

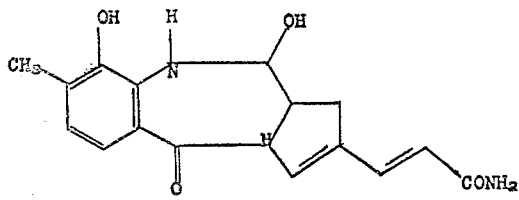

When alcohol is used as the reactant, the product obtained has the formula

IV

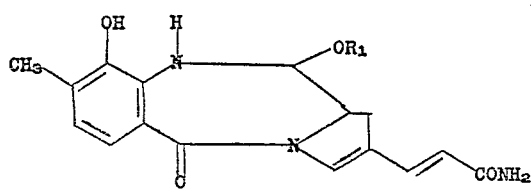

wherein $R_1$ is lower alkyl, phenyl lower alkyl, amino lower alkyl, or a dihydric or polyhydric alcohol residue.

It is to be noted that the compounds of Formulas I and IV are significantly more stable than the compound of Formula III and hence the compounds of Formulas I and IV are highly preferred for use in the practice of the invention.

The compounds of Formulas I, II, III, and IV are useful as anticancer agents, e.g., they are active against S180 and Ehrlich solid tumors in mice, antiprotozoal agents, e.g., against *Endamoeba histolytica* and *Trichomonas vaginalis*, and anthelmintic agents, e.g., against *Syphacia obvelata*. They can be administed orally or by injection, e.g., in the form of an aqueous solution intravenously, such as by slow intravenous drip of a 0.01 percent aqueous solution. Typical intravenous dosages range from about 0.01 to 0.05 mg./kg. animal body weight, and typical oral doses are in the range of about 0.2–2.0 mg./kg. animal body weight, with the dosage adjusted to species and individual requirements.

The process of the invention is illustrated by the following examples which are not meant to limit the invention.

EXAMPLE 1

Several loopfuls of spores of Streptomyces sp. NRRL 3143 are transferred from a mature (2–3 day old) 45° stock agar slant to 100 ml. of germination medium composed as follows in gm. per liter:

| | |
|---|---|
| Bacto tryptone _____ gm __ | 5 |
| Bacto yeast extract _____ gm __ | 2 |
| Bacto soytone _____ gm __ | 2 |
| Soluble starch _____ gm __ | 10 |
| Mannitol _____ gm __ | 5 |
| Magnesium sulfate·$7H_2O$ _____ mg __ | 200 |
| Ferrous ammonium sulfate·$6H_2O$ _____ mg __ | 10 |
| Zinc chloride _____ mg __ | 2.1 |
| Manganous chloride·$4H_2O$ _____ mg __ | 1.8 |
| Copper sulfate·$5H_2O$ _____ mg __ | 0.3 |
| Cobalt nitrate·$6H_2O$ _____ mg __ | 0.5 |
| Boric acid _____ mg __ | 0.6 |

The medium is contained in a 1000 ml. Pyrex Blake bottle. After inoculation the medium is incubated at 45° C., with constant vigorous agitation, on a rotary shaker for 16 hours.

During this period a vigorous growth of the organism ensues.

The contents of two such incubated Blake bottles are pooled into a 500 ml. Pyrex inoculum transfer bottle fitted with a tubulature at the bottom and containing 150 ml. of sterile water.

The entire contents of the inoculum transfer bottle are transferred to a 100-gallon stainless steel fermentor which is prepared for it as follows:

To 25 gallons of clean tap water contained in a stainless steel fermentor fitted for controlled agitation, aeration, and temperature control are added the following inegredients:

| | |
|---|---|
| Potato starch _____ grams __ | 1500 |
| Enzyme hydrolyzed casein[a] _____ do ____ | 750 |
| Enzyme hydrolyzed soy protein[b] _____ do ____ | 300 |
| Aqueous extract of yeast[c] _____ do ____ | 300 |
| Mannitol _____ do ____ | 750 |
| Magnesium sulfate·$7H_2O$ _____ do ____ | 30 |
| Ferrous ammonium sulfate·$6H_2O$ _____ do ____ | 1.5 |
| Zinc chloride _____ mg __ | 315 |
| Manganous chloride·$4H_2O$ _____ mg __ | 270 |
| Copper sulfate·$5H_2O$ _____ mg __ | 45 |
| Cobalt nitrate·$6H_2O$ _____ mg __ | 75 |
| Boric acid _____ mg __ | 90 |
| Dow Corning Silicone A emulsion _____ gms __ | 2.5 |

[a] Sheffield NZ–Amine B.
[b] Difco Bacto Soytone.
[c] Difco Bacto yeast extract.

When all the ingredients are dissolved the volume is brought to 40 gallons (150 liters) with tap water and the pH adjusted to 7.2 with about 60 ml. of 5 N potassium hydroxide.

The fermentor is then closed and the contents sterilized by being brought to a temperature of 120° C. and maintained at that temperature from 30–40 minutes. The batch is then cooled to 48° C. and inoculated as described above.

After inoculation the batch is aerated with 3 cubic feet per minute of sterile air and agitated at a shaft speed of 400 r.p.m., the while maintaining a temperature of 48° C.

EXAMPLE 2

A series of fermentors are prepared with the same basic medium and inoculated as described in Example 1 except that various commercial sources of enzyme-hydrolyzed soy protein and various sources of whole dried yeast, yeast extract, or yeast autolyzate are used in the medium where hydrolyzed soy protein and aqueous extract of yeast were indicated. All media but one give good broth potencies but some media are noticeably superior, as may be seen from the following table:

HARVEST POTENCIES REACHED IN MEDIA CONTAINING VARIOUS SOURCES OF HYDROLYZED SOY PROTEIN AND YEAST ADDITIVES

| Yeast Additive | Maximum Broth Potency Reached in units/ml. | | | | | |
|---|---|---|---|---|---|---|
| | Sheffield Soy T Hydrolyzate | | | Amber Hydrolyzed Soy Protein | | |
| | S. aureus | Sarcina lutea | Bacillus sp. TA | S. aureus | Sarcina lutea | Bacillus sp. TA |
| Amber BYF-50 | 980 | 930 | 1,200 | 710 | 720 | 820 |
| Amber BYF-300 | 930 | 760 | 1,400 | 1,200 | 1,200 | 1,900 |
| National Grain Yeast Autolyzate | 870 | 930 | 1,400 | 860 | 990 | 1,400 |
| Basamin Busch | 1,100 | 970 | 770 | 1,100 | 1,400 | 1,200 |
| Standard Brands Dried Brewers Yeast | 850 | 890 | 1,300 | 980 | 920 | 1,200 |
| Anheuser Busch Dried Debittered Yeast | 700 | 630 | 960 | 1,100 | 1,100 | 1,900 |
| Anheuser Busch Primary Dried Yeast | Did not support growth | | | 690 | 710 | 1,000 |

Foam is controlled by the addition, as needed, of a sterile 2.5% suspension of Dow Silicone Emulsion AF. About 3000 ml. of defoamer suspension is used during the batch. Hourly samples are taken aseptically from the 12th hour on and assayed for in vitro potency. The data obtained on the above batch is shown in the table which follows. This batch reaches its maximum potency in 18–20 hours.

The product is isolated from the above fermentation media according to the process of Example 1.

EXAMPLE 3

Twenty-five gallons of clean tap water are placed into

| Assay Organism | Age in Hours | | | | | | | |
|---|---|---|---|---|---|---|---|---|
| | 13 | 14 | 15 | 16 | 17 | 18 | 19 | 20 |
| | Broth Potency in Units/ml. | | | | | | | |
| Staphylococcus aureus (82) | | | 470 | 650 | 800 | 950 | 1,100 | 1,100 |
| Sarcina lutea (PCI) | | | 680 | 800 | 900 | 950 | 1,000 | |
| Bacillus sp. (TA) | | | | | | | | 1,800 |
| pH | 7.0 | 6.6 | 6.5 | 6.6 | 6.8 | 6.7 | 6.9 | 7.1 |

The above process is repeated ten times, the broths obtained are combined, the pH is adjusted to 6, the combined broths are filtered, and the resulting filtrate is extracted countercurrently at the rate of 128 gallons per hour with about the same rate of butanol, in a 12" diameter by 11 ft. high Karr extraction column. A water backwash of 0.2 times the butanol rate is employed at the top of the extraction column to minimize the carry-over of water soluble components. The butanol extract is concentrated to approximately a 5 percent solution which comprises the feed to the center of a 3" diameter by 20 ft. high Karr fractional liquid extraction column. This column is operated at a water to butanol ratio of about 10 to 1, and the butanol extract contains the product. The butanol extract is concentrated by evaporation to a solution or paste containing about 5 to about 20 percent solids; then about 25 to about 50 volumes of n-hexane are added, and the resulting slurry filtered. The precipitated product is then vacuum-dried to give a solid compound.

a 100-gallon fermentor and used to dissolve the following ingredients:

| | | |
|---|---|---|
| Sheffield peptonized milk nutrient | grams | 3000 |
| Potato starch | do | 1500 |
| Anheuser-Busch dried brewers' yeast | do | 300 |
| Mannitol | do | 750 |
| Magnesium sulfate·7H$_2$O | do | 30 |
| Ferrous ammonium sulfate·6H$_2$O | do | 1.5 |
| Zinc chloride | mg | 315 |
| Manganous chloride·4H$_2$O | mg | 270 |
| Copper sulfate·5H$_2$O | mg | 45 |
| Cobalt nitrate | mg | 75 |
| Boric acid | mg | 90 |
| Dow Corning Silicone AF emulsion | gms | 2.5 |

The volume is brought to 40 gallons with tap water and the pH adjusted to 7.2 with 5 N potassium hydroxide.

The fermentor is then closed and sterilized by heating to 120° C. for 60 minutes. The batch is cooled to 48° C. and inoculated as described in Example 1. The air flow is adjusted to 3 c.f.m., shaft speed 400 r.p.m., and the temperature maintained at 48° C. throughout.

The course of the fermentation may be seen from the data in the table which follows.

| Age in Hours | Bacillus sp. TA, units per ml. | pH |
|---|---|---|
| 16 | 0 | 5.9 |
| 17 | <40 | 5.7 |
| 18 | 310 | 5.8 |
| 19 | 700 | 6.0 |
| 20 | 1,300 | 6.1 |
| 21 | 2,000 | 6.1 |
| 22 | 2,100 | 6.1 |
| 23 | 2,300 | 6.4 |
| 24 | 2,300 | 6.3 |
| 25 | 2,900 | 6.2 |
| 28 | 3,200 | 6.6 |
| 31 | 3,100 | 6.6 |
| 34 | 2,100 | 7.4 |
| 37 | 700 | 7.8 |
| 40 | 70 | 7.9 |

The product is isolated from the above fermentation broth as described in Example 1.

EXAMPLE 4

Three identical 100-gallon fermentors are each charged with 40 gallons of nutrient medium, the composition of which is as follows:

|   | Percent |
|---|---|
| Hydrolyzed soy protein (Amber HSP 75) | 0.2 |
| Water-soluble portion of autolyzed yeast (Amber BYF 300) | 0.2 |
| Tryptic digest of casein (NZ Amine B) | 0.5 |
| Potato starch | 1.0 |
| Magnesium sulfate heptahydrate | 0.02 |
| Trace elements—as described in Example 1. | |

All batches are adjusted to pH 7.0 before sterilization.

The tanks are sterilized at 120° C. for one hour, cooled to 48° C. and tanks 2 and 3 are each inoculated with 150 ml. of 18½ hour growth taken from a batch of culture NRRL 3143 developed on the same medium composition and operating conditions as described for Example 1.

After inoculation, the tanks are each aerated at the rate of 3 cubic feet per minute, agitated at a shaft speed of 400 r.p.m., and maintained at a temperature of 48° C.

At the 12th hour of incubation Tank 2 is adjusted to a pH of 6.8 and acid or alkali is added periodically to maintain the pH between pH 6.7 and 6.9.

Also at the 12th hour, Tank 3 is adjusted to pH 7.2 and the pH is maintained between 7.2 and 7.4 for the duration of the fermentation by the addition, as needed, of appropriate amounts of acid or alkali.

The pH of Tank 1 is allowed to go unadjusted.

It can be seen from the data in the following table that pH control both during the fermentation and thereafter is important.

EXAMPLE 5

7 g. of the product prepared by the process of Example 1 is dissolved in 350 ml. of chloroform-isopropanol (1:1) which was previously equilibrated with water. This solution is introduced into the center of a one-inch diameter by twenty-foot high Karr extraction column at the rate of 0.5 ml./min. Simultaneously 60 ml./min. of equilibrated aqueous phase is introduced at the bottom of the column and 14.6 ml./min. of equilibrated solvent phase is introduced at the top of the column. Most of the product is extracted into the aqueous phase leaving the top of the column. The aqueous phase is re-extracted countercurrently in a one-inch diameter by ten-foot high extraction column employing a 1:1 isopropanol-chloroform solvent at a solvent to water ratio of 1:1. The product passes into the isopropanol-chloroform solvent which leaves at the bottom of the extraction column. This solution is concentrated to 58 ml., filtered, and then treated with 2.9 liters of technical hexane to precipitate the product. The product is filtered and dried.

The dried product which is 90 percent pure is crystallized from acetone to yield a highly active purified material.

EXAMPLE 6

20 g. of the product prepared according to Example 1 was distributed between 120 ml. each of upper and lower phases of a solvent system consisting of isopropanol; chloroform:water (1:1:2). The phases were then introduced into the first three tubes of a 200-tube Craig countercurrent distribution apparatus and run at room temperature for 197 transfers. The upper and lower phases of tubes 45 to 75 were combined, the organic phase evaporated at a temperature below 35° C. in vacuo and the residue added to the corresponding aqueous phase, and the aqueous phase lyophylized. The lyophylized residue was crystallized from acetone to yield a purified material.

EXAMPLE 7

200 g. of the product prepared according to Example 1 is dissolved in 4000 ml. of methanol and the solution filtered. The filtrate is agitated and 332 ml. of water added during the course of one hour. The temperature during the addition is maintained at 22° C. The solution is then cooled to 0° C. in one hour and then stirred overnight in a cooled bath maintained at −9° C. Then the resulting slurry is filtered, washed twice with a minimum quantity of aqueous methanol (8.3 volume/volume percent $H_2O$), and dried in a vacuum dessicator at room temperature. 86.9 g. of dark brown precipitate is obtained.

The above precipitate is dissolved in 4340 ml. of methanol, filtered, and 672.7 ml. of water slowly added over a period of 3 hours at a temperature of 0° C. The resulting mixture is then placed in a cooled bath at INFLUENCE OF pH CONTROL OF THE BATCH ON THE YIELD AND STABILITY OF THE ANTIBIOTIC

| Tank No. | Treatment | Broth Potency in units (TA) per ml. | | | | | | | | | | | | |
|---|---|---|---|---|---|---|---|---|---|---|---|---|---|---|
| | | Age in Hours | | | | | | | | | | | | |
| | | 12 | 13 | 14 | 15 | 16 | 17 | 18 | 19 | 20 | 21 | 22 | 23 | 24 |
| 1 | No pH adjustment | | | | 370 | 580 | 780 | 1,100 | 1,000 | 730 | 700 | 630 | 400 | |
| | pH of broth | | | | 6.9 | 6.9 | 6.9 | 6.8 | 6.8 | 7.1 | 7.1 | 7.0 | 7.3 | |
| 2 | pH maintained at 6.7–6.9 from 12th hour on. | 0 | 290 | 700 | 1,400 | 2,600 | 3,000 | 3,000 | 2,900 | 3,000 | 2,900 | 3,200 | 2,900 | 2,700 |
| | pH of broth | 6.8 | 6.8 | 6.8 | 6.8 | 6.8 | 6.8 | 6.8 | 6.9 | 6.7 | 6.7 | 6.7 | 6.7 | 6.9 |
| 3 | ph maintained at 7.2–7.4 from 12th hour on. | 0 | 150 | 420 | 910 | 1,400 | 4,200 | 4,600 | 4,300 | >3,000 | 2,700 | 1,800 | 1,600 | 1,600 |
| | pH of broth | 7.2 | 7.2 | 7.2 | 7.2 | 7.2 | 7.2 | 7.2 | 7.3 | 7.3 | 7.2 | 7.2 | 7.3 | 7.4 |

−9° C. and then stirred overnight. The crystals are then filtered off, washed with a minimum of aqueous methanol at −20° C. (15.5 volume/volume percent H₂O) and vacuum dried at room temperature. 69.8 g. of a yellow needlelike crystalline solid is obtained. The crystalline solid is again dissolved in 4340 ml. of methanol, 6.95 g. activated charcoal (Norite SG) are added with stirring and after 10 minutes at room temperature filtered off and the filtrate treated with 672.7 ml. of water added slowly over a period of 3 hours at 0° C. The mixture is then placed in a cooled bath at −9° C. and stirred overnight. The resulting crystals are filtered, washed with a minimum of aqueous methanol at −20° C. and vacuum dried at room temperature. 59.6 g. of a light yellow crystalline product of Formula I is obtained:

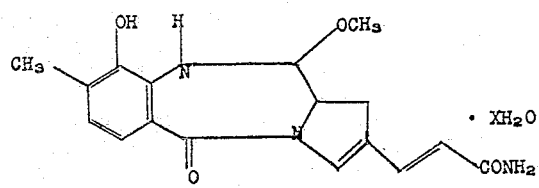
I

The product of Formula I was recrystallized from acetonitrile to prepare the corresponding anhydrous compound of the formula

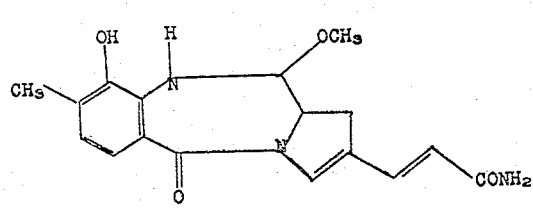
Ia

EXAMPLE 8

3 g. of the compound of Formula I obtained in Example 7 is dissolved in 600 ml. of acetonitrile. The resulting solution is concentrated by distillation at atmospheric pressure to a small volume (about 200 ml.). A crystalline solid is obtained which is again dissolved in 450 ml. of acetonitrile and the resulting solution is concentrated by distillation at atmospheric pressure to about 100 ml. The compound of Formula II crystallizes out, melting point 205–206° dec. (vac.):

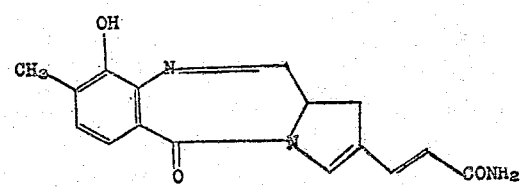
II

EXAMPLE 9

0.1 g. of the compound of Formula II obtained in the above Example 8 is dissolved in 50 ml. of boiling acetonitrile. An excess of water was added and the mixture allowed to stand for one hour at room temperature. The resulting solution is concentrated by distillation to a small volume at room temperature under vacuum. On standing, crystals of the compound of Formula III are obtained which melt at 188–194° dec. (vac.):

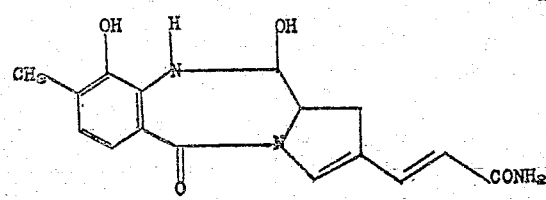
III

EXAMPLE 10

65 mg. of the compound of Formula II obtained in Example 8 above is dissolved in 15 ml. of n-butanol at room temperature. The resulting clear solution is concentrated to a small volume at room temperature under high vacuum. The residue is treated with 30 ml. of n-hexane. A product having the formula

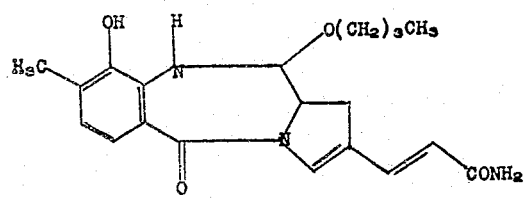
V precipitated out, melting point 155–175° C. with decomposition (vac.).

EXAMPLE 11

0.2 g. of the compound of Formula II obtained in Example 8 above is dissolved in 100 ml. of boiling acetonitrile and 5 ml. of benzyl alcohol added thereto. The resulting solution is allowed to stand for 3 hours at room temperature. The acetonitrile is removed under vacuum at room temperature. The residue is treated with 100 ml. of ether. A product having the formula

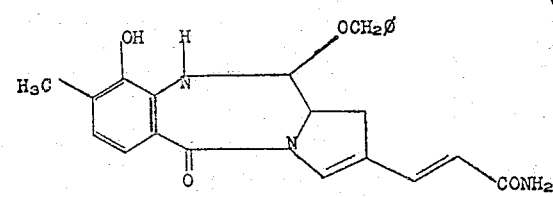
VI precipitates out, melting point 108–109° C.

In the specification, the terms "unit/ml." or "units/ml.", e.g. referring to broth potency, are to be understood as follows: 20 units/ml. is the value arbitrarily assigned to an aqueous solution which produces an 18–22 mm. diameter zone of inhibited growth in the known cup plate agar diffusion assay when either *Staphylococcus aureus* or *Bacillus sp.* TA is used as the test organism.

We claim:
1. A compound having the formula:

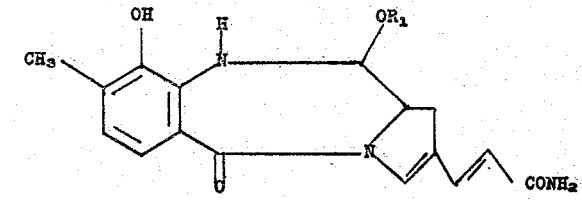

wherein $R_1$ is selected from the group consisting of lower alkyl, phenyl lower alkyl, and amino-lower alkyl.

2. A compound having the formula:

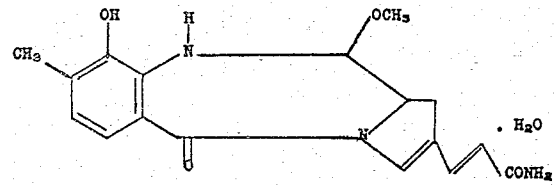

3. A compound having the formula:

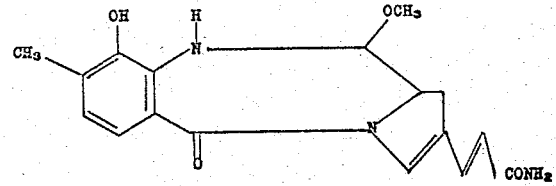

4. A compound having the formula:

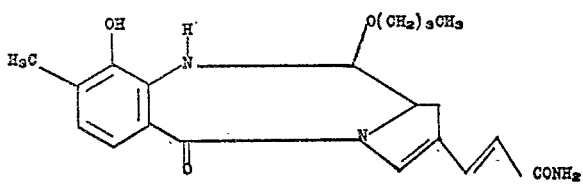

5. A compound having the formula:

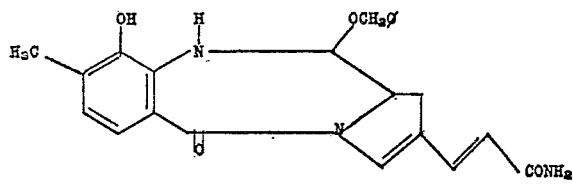

6. A compound having the formula:

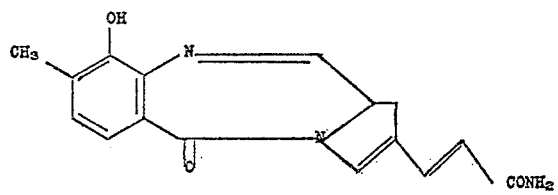

7. A compound having the formula:

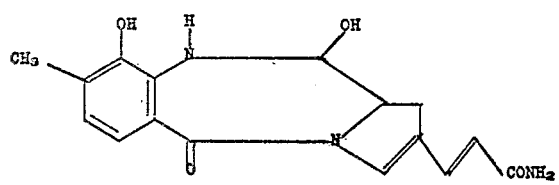

8. A crystalline form of the compound of claim 7.

9. A process for the preparation of a compound of the formula:

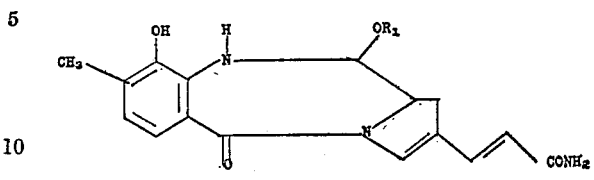

wherein $R_1$ is selected from the group consisting of lower alkyl, phenyl lower alkyl, and amino-lower alkyl, comprising reacting a compound of the formula:

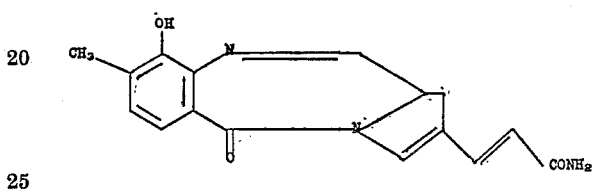

with an alcohol selected from the group consisting of a lower alkanol, phenyl lower alkanol, and amino-lower alkanol.

References Cited

UNITED STATES PATENTS 3,247,187   4/1966   Fryer et al. _____ 260—239.3

WALTER A. MODANCE, *Primary Examiner.*

R. T. BOND, *Assistant Examiner.*